Dec. 1, 1959   J. VERDERBER   2,914,977
FLUID-ACTUATED CLAMPING DEVICE
Filed Sept. 19, 1958   4 Sheets-Sheet 1

INVENTOR.
JOSEPH VERDERBER
BY
Isler & Ornstein
ATTORNEYS

Dec. 1, 1959  J. VERDERBER  2,914,977
FLUID-ACTUATED CLAMPING DEVICE
Filed Sept. 19, 1958  4 Sheets-Sheet 2

INVENTOR.
JOSEPH VERDERBER
BY
*Isler & Ornstein*
ATTORNEYS

Dec. 1, 1959  J. VERDERBER  2,914,977
FLUID-ACTUATED CLAMPING DEVICE
Filed Sept. 19, 1958  4 Sheets-Sheet 3
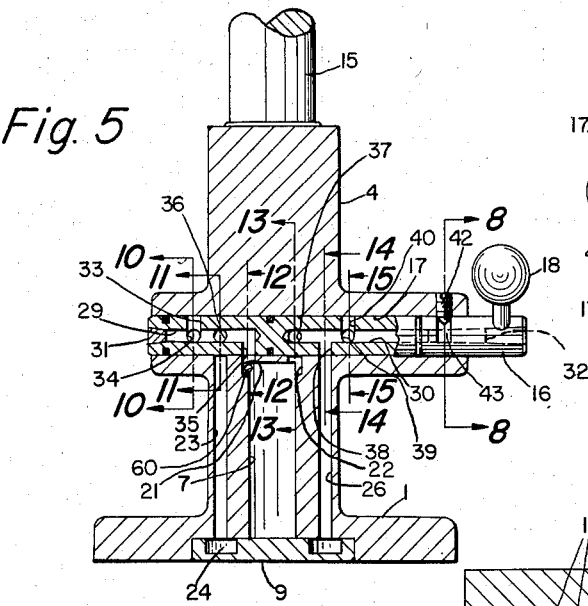
Fig. 5
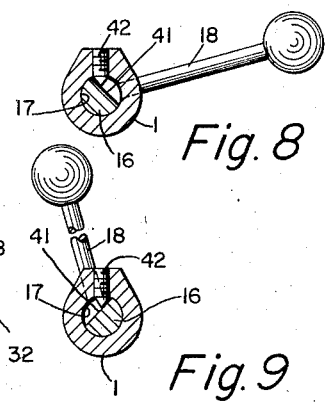
Fig. 8
Fig. 9
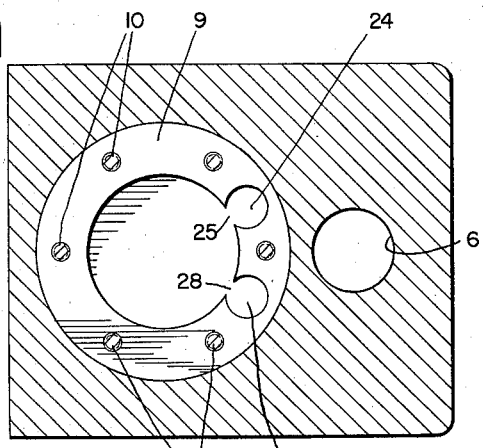
Fig. 6
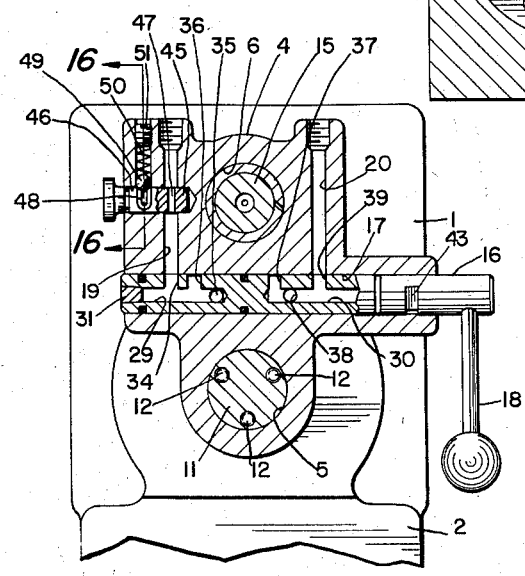
Fig. 7
INVENTOR.
JOSEPH VERDERBER
BY
*Isler & Ornstein*
ATTORNEYS Dec. 1, 1959  J. VERDERBER  2,914,977
FLUID-ACTUATED CLAMPING DEVICE
Filed Sept. 19, 1958  4 Sheets-Sheet 4

INVENTOR.
JOSEPH VERDERBER
BY
ATTORNEYS

2,914,977

FLUID-ACTUATED CLAMPING DEVICE

Joseph Verderber, Cleveland, Ohio

Application September 19, 1958, Serial No. 762,113

7 Claims. (Cl. 81—17.2)

This invention contemplates a fluid-actuated clamping device which, in addition to utilizing a compressed fluid, such as air, as an actuating medium, also employs a movable plunger, as a clamping member.

Devices of this general type are described in my copending application, Serial No. 725,695, filed April 1, 1958 and on pages 11-13 of Catalog No. 56, published in 1952 by The Cleveland Universal Jig Company.

A primary object of the invention is to provide an efficient clamping device, all of the parts of which are readily removable for repair or replacement purposes, and which consists of a minimum number of operating parts.

Another object of the invention is to provide a device of the character described, in which a rotatable control valve is utilized to control the clamping and unclamping action, and the valve is so constructed as to utilize passageways and ports in the valve itself, thereby reducing the necessity of providing an excessive number of passageways in the base or body of the clamping device, and thus reducing cost of manufacture.

A further object of the invention is to provide means for bleeding a portion of the air used in the clamping action, and utilizing such air for floating the clamping device, thereby facilitating certain machining operations, such as drilling.

A still further object of the invention is to provide a device of the character described, which embodies an air control valve of novel and unusual construction.

Other objects and advantages of my invention will be apparent during the course of the following description.

In the accompanying drawings forming a part of this specification, and in which like numerals are employed to designate like parts throughout the same, Fig. 1 is a top plan view of the clamping device;

Fig. 5 is a cross-sectional view, taken on the line 5—5 of Fig. 1, and showing the control valve in the "clamping" position;

Fig. 6 is a cross-sectional view, taken on the line 6—6 of Fig. 4;

Fig. 7 is a cross-sectional view, taken on the line 7—7 of Fig. 2;

Fig. 8 is a cross-sectional view, taken on the line 8—8 of Fig. 5;

Fig. 9 is a view similar to Fig. 8, but with the control valve in the releasing or "unclamping" position;

Figure 1:
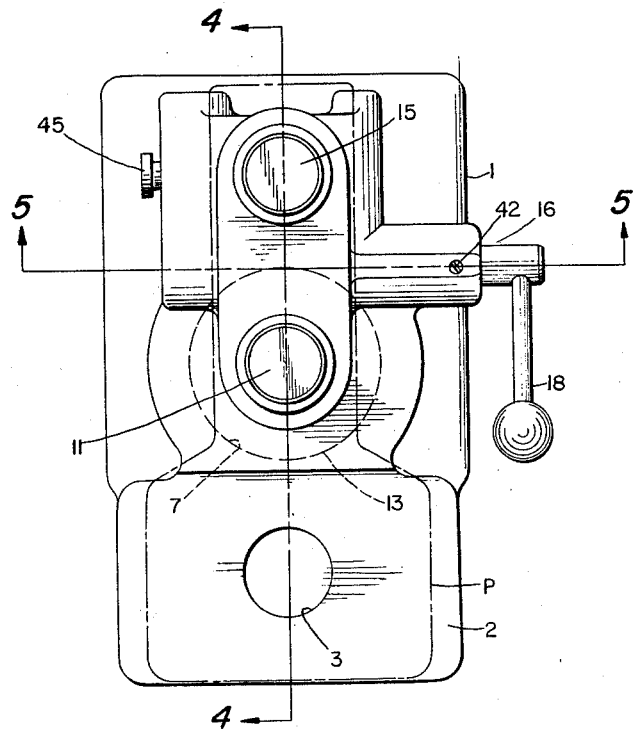
Figure 2:
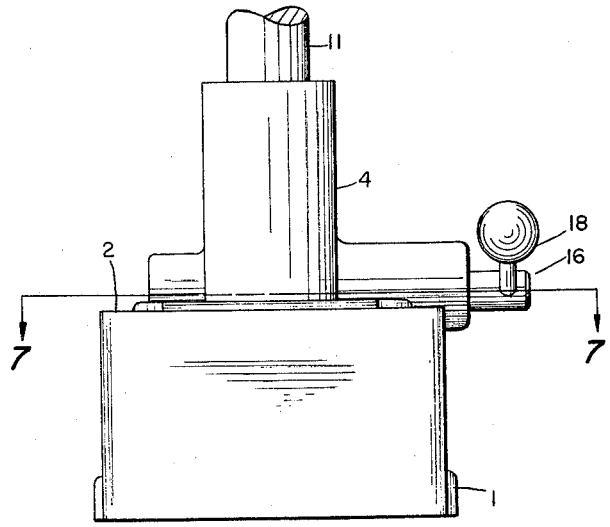
Fig. 2 is a front elevational view of the device.

Referring more particularly to the drawings, the clamping device is seen to comprise a rigid cast iron base 1 having a forward portion or pad 2 formed integrally therewith, which pad has a drill clearance hole 3, extending vertically therethrough.

Projecting vertically upward from the base 1, and integral therewith is a standard 4 having spaced bores 5 and 6 extending vertically therethrough. The bore 5 is counterbored as at 7 to provide a cylinder and the bore 7 is further counterbored, as at 8, for the reception of a cap 9, which closes the lower end of the cylinder 7, and is removably secured to the base 1, as by screws 10.

Figure 3:
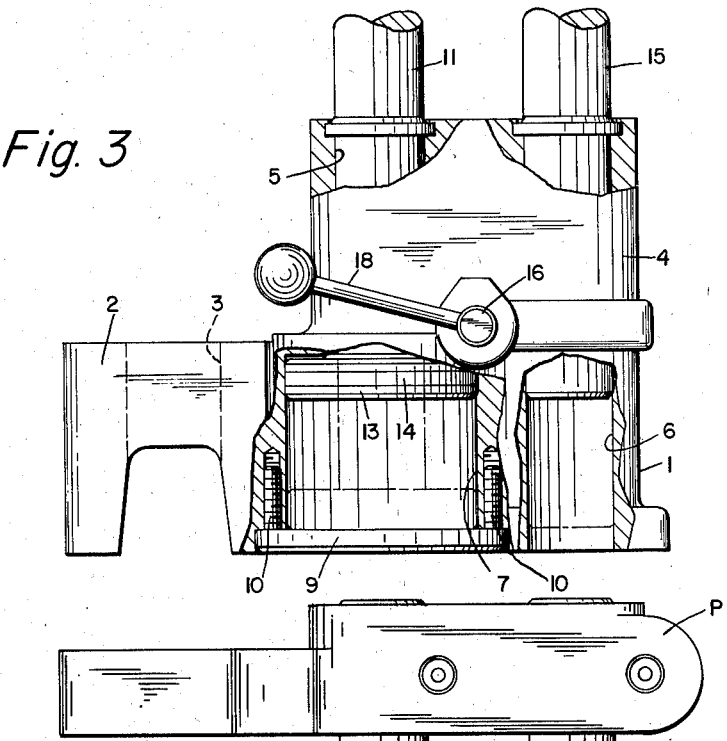
Fig. 3 is a side elevational view of the device, as viewed from the right side of Fig. 2, with portions thereof broken away to show constructional features.

Slidably mounted in the bore 5 is a plunger 11, having secured to the lower end thereof, as by screws 12, a piston head 13. The head 13 is movable in the cylinder 7, between the extreme positions shown in solid and broken lines in Fig. 3, and is provided with a piston ring 14.

Secured to the upper end of the plunger 11, as by means of a binder plug (not shown) is a clamping plate or top plate of suitable size and form. Such a top plate is indicated in Fig. 1 in broken lines, and is designated by the reference character P.

Secured to the top plate P, rearwardly of the plunger 11, is a second plunger 15, which is slidable in the bore 6 of the standard 4, and serves as a pilot, which guides the top plate P in its vertical movement and prevents rotation of the top plate about the axis of the bore 5 during such movement.

For the purpose of admitting air, under pressure, into the cylinder 7, for the purpose of actuating the piston head 13, the base 1 is provided with a series of passageways, which are interconnected by a control valve, generally designated by reference numeral 16, which is rotatably mounted in a horizontal bore or cylinder 17 which extends transversely through the base 1, and is actuated by a handle 18, secured to one end of the valve. The construction and function of this control valve will be described after the air passageways in the base have been described.

Figure 15:
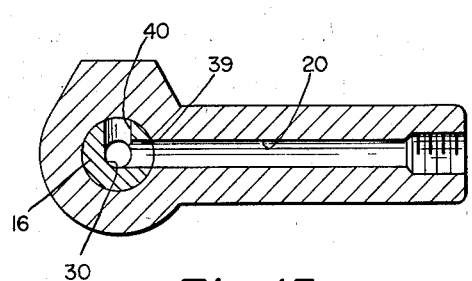
Fig. 15 is a fragmentary cross-sectional view, taken on the line 15—15 of Fig. 5.

These passageways include an air inlet passageway 19, (Figs. 7 and 10) extending horizontally from the rear of the base to the rear of the bore or cylinder 17, and a similar air exhaust passageway 20 (Figs. 7 and 15), extending horizontally from the rear of the bore or cylinder 17 to the rear of the base 1, the passageways 19 and 20 being in parallel spaced relation to each other.

Figure 12:
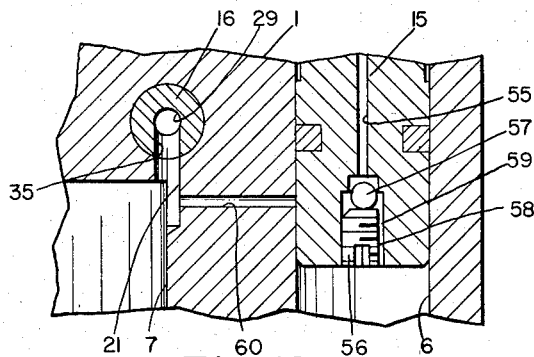
Fig. 12 is a fragmentary cross-sectional view, taken on the line 12—12 of Fig. 5.
Figure 13:
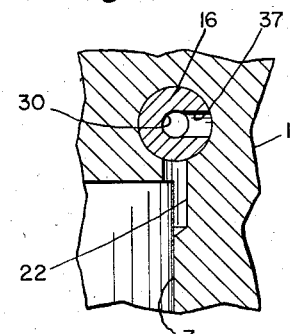
Fig. 13 is a fragmentary cross-sectional view, taken on the line 13—13 of Fig. 5.

Extending from the bottom of the bore or cylinder 17, vertically downward through the base, so as to communicate with the upper end of the cylinder 7, is a short passageway 21 (Figs. 5 and 12). A similar passageway 22 (Figs. 5 and 13), in spaced relation to the passageway 21, extends from the bottom of the bore or cylinder 17 vertically downward through the base, so as to communicate with the upper end of the cylinder 7.

Figure 11:
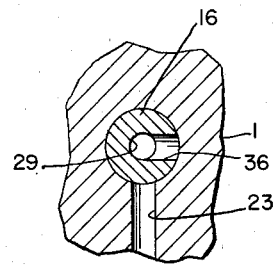
Fig. 11 is a fragmentary cross-sectional view, taken on the line 11—11 of Fig. 5.

A long passageway 23 (Figs. 5 and 11) extends vertically downward through the base from the bottom of the bore or cylinder 17 to the cap 9, where it communicates with a passageway 24 in the cap (Fig. 6), the passageway 24 communicating, in turn, with the lower end of the cylinder 7 through a passageway 25.

Figure 14:
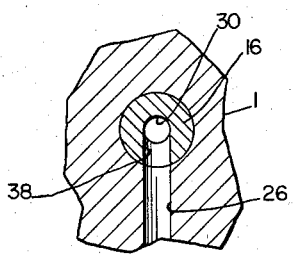
Fig. 14 is a fragmentary cross-sectional view, taken on the line 14—14 of Fig. 5.

A similar passageway 26 (Figs. 5 and 14), parallel with the passageway 23, extends vertically downward through the base from the bottom of the bore or cylinder 17 to the cap 9, where it communicates with a passageway 27 in the cap (Fig. 6), the passageway 27 communicating, in turn, with the lower end of the cylinder 7 through a passageway 28.

The control valve 16 has a pair of axially-extending, axially aligned passageways 29 and 30 therein. The outer end of the passageway 29 is closed by means of a taper pin 31, and the outer end of the passageway 30 is closed by means of a taper pin 32.

Extending radially from the passageway 29 is an inlet bore 33, a second inlet bore 34 spaced circumferentially 90 degrees from the bore 33 and in the same diametral plane as the latter, an outlet bore 35 spaced from the bore 33 and circumferentially 180 degrees from the latter, and a second outlet bore 36 intermediate the bores 34 and 35 and parallel with the bore 34.

Extending radially from the passageway 30 is an outlet bore 37, parallel with the bores 34 and 36, a second outlet bore 38, parallel with the bore 35 and spaced axially from the bore 37, a third outlet bore 39, parallel with the bore 37 and spaced axially from the bores 37 and 38, and a fourth outlet bore 40, parallel with the bore 33 and in the same diametral plane as the bore 39.

The control valve 16 is rotatable by means of the handle 18 between two extreme positions, at one of which a clamping action of the top plate P occurs, and at the other of which the top plate P is released. These positions are determined by the engagement of a flat surface 41 (Figs. 8 and 9) of the valve with a dog point screw 42 which is secured in the base 1 and extends into the recess 43 of the valve, the bottom of which recess forms the surface 41. The screw 42 also serves to lock the control valve against axial displacement from its operative position.

The operation of the device may now be described as follows:

With the control valve in the "clamping" position, as shown in Figs. 5 and 7, air flows from inlet passageway 19 through port 34, passageway 29, port 35, and passageway 21 into the upper end of the cylinder 7. The air entering the cylinder acts on the piston head 13 to force the plunger 11 from the position shown in solid lines to the position shown in broken lines in Fig. 3, thereby causing the top plate P to clamp work to the pad 2. At the same time, the air in the cylinder 7, which is forced out of the cylinder by the downward movement of the piston head, leaves the cylinder, enters passageway 28, and passes through passageways 27, 26, port 38, passageway 30, port 39, and into the exhaust passageway 20. The exhaust air, issuing from passageway 20 may be muffled by a muffler (not shown) similar to that described in my copending application, Serial No. 726,083, filed April 3, 1958.

With the control valve in the "unclamping" position, as shown in Fig. 9, air flows from inlet passageway 19, through port 33, passageway 29, port 36, passageway 23, and passageways 24 and 25 into the lower end of the cylinder. The air entering the lower end of the cylinder acts on the piston head 13 to force the plunger 11 to the position shown in solid lines in Figs. 3 and 4, thereby causing the top plate P to release or unclamp work which has been clamped to the pad 2 by the top plate. At the same time, the air in the cylinder 7, which is forced out of the cylinder by the upward movement of the piston head, leaves the cylinder, enters passageway 22 and passes through port 37, passageway 30, port 40, and into the exhaust passageway 20.

Means have also been provided for controlling the speed of movement of the plunger 11, and thereby the speed of the clamping and unclamping action. Such means is best illustrated in Figs. 1, 7, 10 and 16 of the drawings, and comprises a valve 45 which is disposed in a horizontal bore 46 of the base 1. This valve is provided with a passageway 47 extending diametrically therethrough, which passageway is adapted to be aligned with the passageway 19 (see Figs. 7 and 10), and when thus aligned, the maximum volume of air passes through the passageway 19, and a maximum speed of movement of the plunger 11 is effected.

Figure 10:
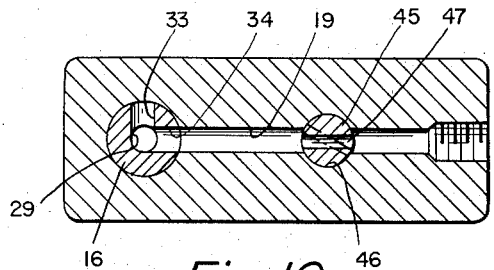
Fig. 10 is a cross-sectional view, taken on the line 10—10 of Fig. 5.

The valve 45 may be rotated to a position in which the passageway 47, as shown in broken lines in Fig. 10, is partially closed by the wall of the bore 46, so that a lesser volume of air is permitted to pass through the passageway 19, and a half speed of movement of the plunger 11 is effected.

Figure 16:
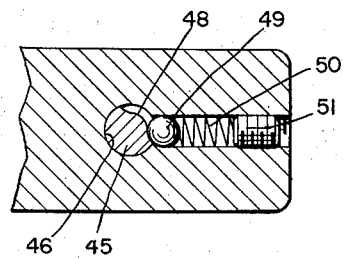
Fig. 16 is a fragmentary cross-sectional view, taken on the line 16—16 of Fig. 7.

For the purpose of maintaining the valve 45 in its proper axial position and against axial displacement, the valve is provided with an arcuate recess or groove 48, as best shown in Figs. 7 and 16, and a ball 49 is resiliently urged into this recess, as by means of a compression coil spring 50, retained against the ball by a set screw 51. The ends of the recess 48 form stops which, when engaged by the ball 49, determine the two positions of the valve 45, which are shown in Fig. 10.

Figure 4:
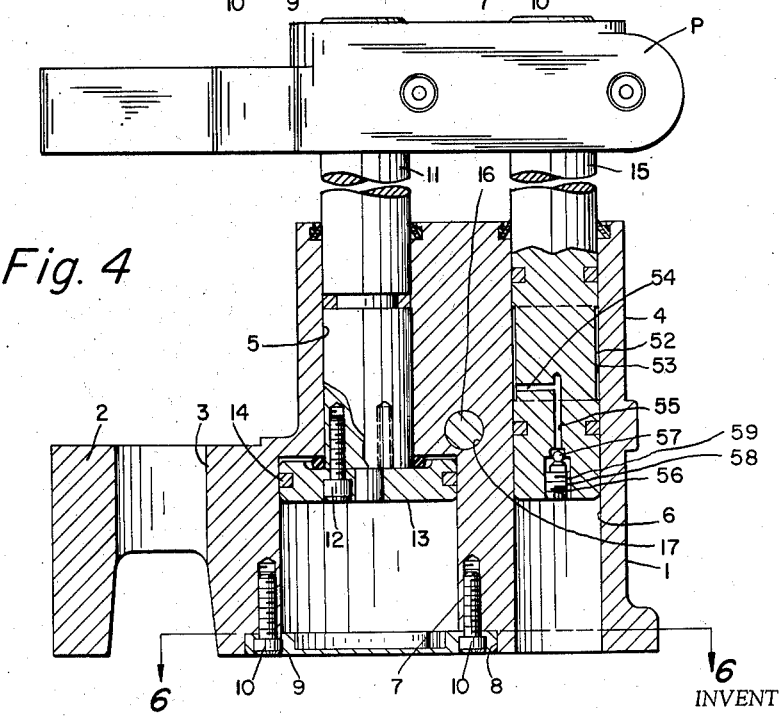
Fig. 4 is a cross-sectional view, taken on the line 4—4 of Fig. 1.

Means have further been provided for enabling the clamping device to be easily moved about on the surface which supports the device, so as to facilitate drilling and other operations. Such means is best illustrated in Figs. 4, 5 and 12, and may be described as follows:

A portion 52 of the pilot plunger 15, is of reduced diameter, so as to provide an annular space 53 between this portion of the plunger and the wall of the bore 6 in the standard 4 and base 1. Extending radially inwardly into the plunger from the exterior of the portion 52 is a passageway 54 which terminates at the upper end of an axial bore 55 in the lower end of the plunger. Secured to the pilot plunger 15, at the lower end of the bore 55, is a dog point set screw 56, which supports a steel ball 57. The set screw 56 is flattened at one side thereof, as at 58, to provide a passageway 59 for air from the bore 55. The ball 57 serves as a valve, which may be adjusted by means of the screw 56, to vary the amount of air leaving the bore 55.

The base 1 has a passageway 60 extending horizontally from the passageway 21 to the wall of the bore 6.

When air is passed through the passageway 21 for the purpose of moving the top plate to the clamping position, a small portion of this air is bled through the passageway 60, and when the portion 52 of the pilot plunger 15 traverses the passageway 60, this air which is bled through the passageway 60 passes through the space 53, passageway 54, bore 55 and passage 59, and into the space between the bottom of the base 1 and the surface on which the device is supported, providing an air cushion in this space which literally floats the device, enabling it to be easily moved about, so as to facilitate drilling and other operations.

It is thus seen that I have provided a clamping device which fulfills all of the objects of the invention.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a device of the character described, a base member having a cylindrical bore therein, a plunger having a piston head movable in said bore, means for supplying a fluid under pressure to actuate said piston head, and means responsive to said actuation for bleeding a portion of said fluid to the space beneath said base member to provide an air cushion beneath said base member, for facilitating movement of said device on a supporting surface.

2. In a device of the character described, a base member, a top plate movable in relation to said base member fluid pressure means for actuating said top plate, and means responsive to movement of the top plate for bleeding some of said fluid to the space beneath said base member, to provide an air cushion beneath said base member, for facilitating movement of said device on a supporting surface.

3. In a device of the character described, a base member having a cylindrical bore therein, a plunger having a piston head movable in said bore, means for supplying a fluid under pressure to actuate said piston head, said base member having a second bore therein, a pilot plunger movable in said second bore, and means for bleeding a portion of said air through said pilot plunger to the space beneath said base member to provide an air cushion beneath said base member, for facilitating movement of said device on a supporting surface.

4. A device, as defined in claim 3, in which said pilot plunger has a portion of reduced diameter, forming an annular space between the wall of said second bore and said portion of reduced diameter, and a passageway is provided in the base member, which communicates the first bore with the second bore.

5. A device, as defined in claim 4, in which passageways are provided which communicate said annular space with the lower end of the pilot plunger, and a plug is secured to the lower end of the pilot plunger, said plug having an axial bore which communicates with said last-named passageways.

6. In a device of the character described, a base member, a plunger, a clamping plate secured to said plunger, means for supplying a fluid under pressure to actuate said plunger for moving said clamping plate toward said base, to clamp work between said plate and base member, and means responsive to said movement for bleeding a portion of said fluid to the space beneath said base member to provide an air cushion beneath said base member, for facilitating movement of said device on a supporting surface.

7. A device as defined in claim 6, in which said base member has a cylindrical bore therein, and the plunger has a piston head movable in said bore.

References Cited in the file of this patent

UNITED STATES PATENTS

| | | |
|---|---|---|
| 2,169,631 | Cross | Aug. 15, 1939 |
| 2,282,488 | MacClatchie | May 12, 1942 |
| 2,436,656 | Marsilius | Feb. 24, 1948 |
| 2,574,589 | Ragin | Nov. 13, 1951 |
| 2,678,072 | Verderber | May 11, 1954 |
| 2,728,353 | Bonham | Dec. 27, 1955 |
| 2,743,787 | Seck | May 1, 1956 |
| 2,781,056 | Carufel | Feb. 12, 1957 |
| 2,788,862 | Langer | Apr. 16, 1957 |

FOREIGN PATENTS

| | | |
|---|---|---|
| 268,014 | Switzerland | July 17, 1950 |